US012354564B2

(12) United States Patent
Cho et al.

(10) Patent No.: US 12,354,564 B2
(45) Date of Patent: Jul. 8, 2025

(54) DISPLAY DEVICE AND STATUS DISPLAY METHOD THEREOF

(71) Applicant: LX SEMICON CO., LTD., Daejeon (KR)

(72) Inventors: Hyun Pyo Cho, Daejeon (KR); Myung Yu Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/537,179

(22) Filed: Dec. 12, 2023

(65) Prior Publication Data

US 2024/0194158 A1 Jun. 13, 2024

(30) Foreign Application Priority Data

Dec. 13, 2022 (KR) ........................ 10-2022-0173647
Nov. 21, 2023 (KR) ........................ 10-2023-0162583

(51) Int. Cl.
*G09G 3/36* (2006.01)
*G09G 3/3225* (2016.01)

(52) U.S. Cl.
CPC ......... *G09G 3/3607* (2013.01); *G09G 3/3225* (2013.01); *G09G 3/3648* (2013.01); *G09G 2320/0242* (2013.01); *G09G 2320/029* (2013.01)

(58) Field of Classification Search
CPC .. G09G 3/3607; G09G 3/3225; G09G 3/3648; G09G 3/2003; G09G 3/006; G09G 2320/0242; G09G 2320/029; G09G 2330/12; G09G 2370/08
See application file for complete search history.

(56) References Cited

U.S. PATENT DOCUMENTS

2011/0231270 A1* 9/2011 Dykes ..................... G06Q 20/10 705/16
2018/0068600 A1* 3/2018 Kim ..................... G09G 3/2096
2018/0165051 A1* 6/2018 Kim ......................... G09G 5/14

FOREIGN PATENT DOCUMENTS

KR 10-2006-0037754 A 5/2006
KR 20060037754 A * 5/2006

OTHER PUBLICATIONS

Extended European Search Report dated Apr. 30, 2024, issued for the corresponding European patent application No. 23216086.1, 9 pages.

* cited by examiner

*Primary Examiner* — Brent D Castiaux
(74) *Attorney, Agent, or Firm* — ROTHWELL, FIGG, ERNST & MANBECK, P.C.

(57) ABSTRACT

A display device according to an embodiment of the present invention may comprise a panel configured to include a plurality of RGB groups, each of the plurality of RGB groups includes a plurality of RGB channels and each of the plurality of RGB channels include a plurality of RGB pixels and a source driver configured to: obtain error information based on error test information for testing an error of data transmitted from a timing controller, convert the error information into an identification code, generate an RGB information set matching the converted identification code, and supply a data voltage to each of a plurality of RGB groups constituting the panel based on the generated RGB information set, wherein the panel is configured to display the identification code based on the data voltage.

20 Claims, 5 Drawing Sheets

DISPLAY DEVICE AND STATUS DISPLAY METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2022-0173647, filed on Dec. 13, 2022 and Korean Patent Application No. 10-2023-0162583, filed on Nov. 21, 2023, the contents of which are all hereby incorporated by reference herein in their entirety.

BACKGROUND

1. Field

This disclosure relates to a display device, and more specifically, to a display device that may simply express status information of the display device.

2. Background

Display device such as Liquid Crystal Display (LCD) device and Organic Light Emitting Display (OLED) device are commonly used in electronic device such as televisions, computers, and mobile phones.

The display device displays an image when image data (RGB data) is supplied to the source driver by a timing controller.

Typically, the image data supplied from the timing controller to the source driver is transmitted at a sufficiently low frequency that bit error is relatively rare.

Previously, in order to notify information about bit error, information about bit error was transmitted to the shipment inspection device through the read-back Protocol, expressed visually in the form of a line on the screen, or a character string was directly displayed on the screen to express accurate numbers or information.

However, as in the past, when information about bit error is transmitted to a shipment inspection device through a read-back protocol, there is the inconvenience of having to implement a means for the read-back protocol in the shipment inspection device.

Additionally, when information about bit error is provided in the form of lines as before, there was a problem that only simple information was provided.

In addition, as in the past, the method of directly expressing a character string in an image to express accurate number or information about bit error has the problem of requiring a complex design structure of the source driver or gate driver.

SUMMARY

The purpose of the present invention is to determine the status of the source driver by providing specific test result for the source driver in Morse code form.

The purpose of the present invention is to check error without the need to implement a separate read-back protocol in a shipment inspection device that inspects a display device.

A display device according to an embodiment of the present invention may comprise a panel configured to include a plurality of RGB groups, each of the plurality of RGB groups includes a plurality of RGB channels and each of the plurality of RGB channels include a plurality of RGB pixels and a source driver configured to: obtain error information based on error test information for testing an error of data transmitted from a timing controller, convert the error information into an identification code, generate an RGB information set matching the converted identification code, and supply a data voltage to each of a plurality of RGB groups constituting the panel based on the generated RGB information set, wherein the panel is configured to display the identification code based on the data voltage.

A method for displaying the status of a display device including a panel including a plurality of RGB groups, and a source driver according to an embodiment of the present invention may comprises obtaining, by the source driver, error information based on error test information for testing an error of data transmitted from a timing controller; converting, by the source driver, the obtained error information into an identification code; generating, by the source driver, a RGB information set matching the converted identification code; supplying, by the source driver, a data voltage to each of a plurality of RGB groups constituting the panel based on the generated RGB information set; and displaying, by the panel, the identification code based on the data voltage.

According to an embodiment of the present invention, the internal state and error state of the source driver may be simply and accurately identified as specific test result for the source driver are displayed on the panel using Morse code.

Additionally, according to an embodiment of the present invention, information about errors may be provided without the need for a separate read-back protocol to be implemented in a shipment inspection device that inspects a display device, thereby reducing costs.

Additionally, according to an embodiment of the present invention, error information may be identified by probing only some RGB groups of the panel, so error test result may be easily performed.

DETAILED DESCRIPTION OF THE PREFERRED EMBODIMENTS

Figure 1:
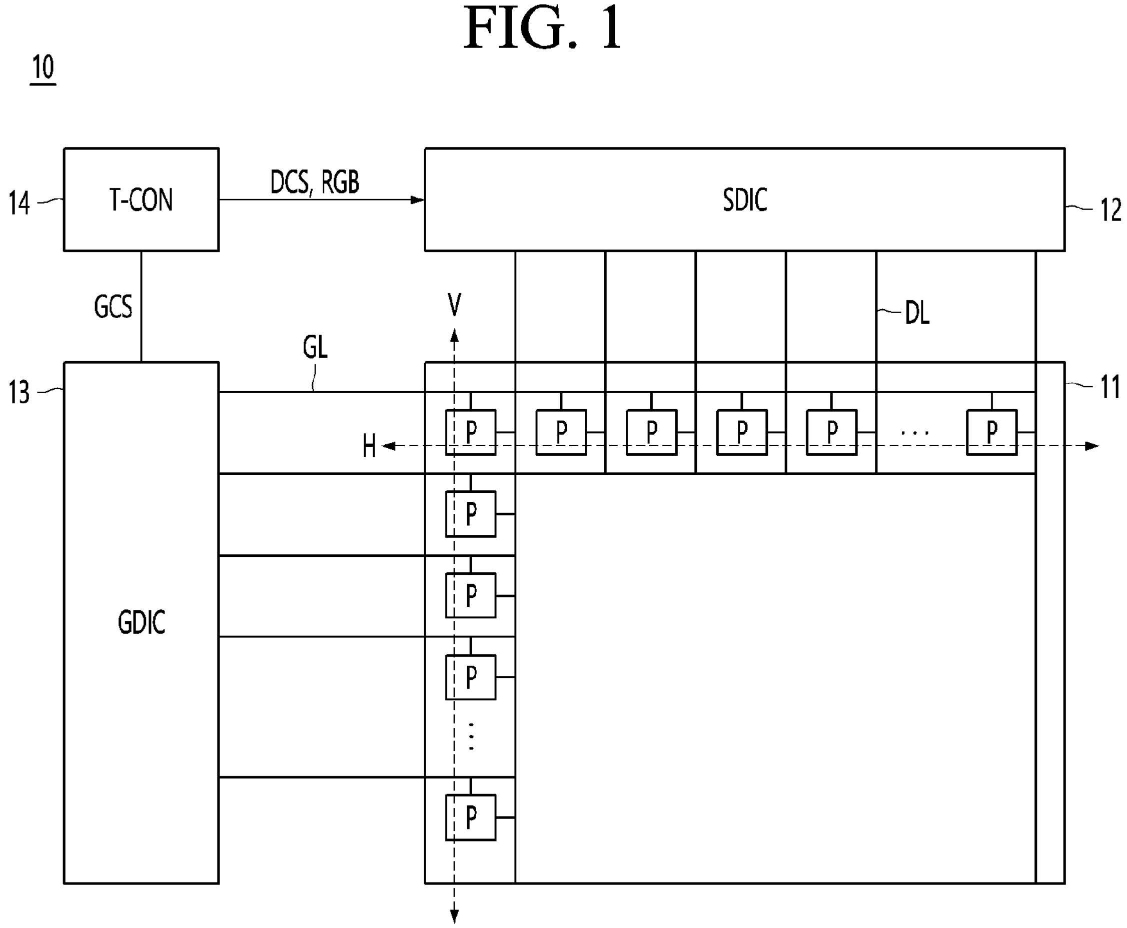
FIG. 1 is a configuration diagram of a display device according to an embodiment.

Hereinafter, the present disclosure will be described in more detail with reference to the drawings.

Hereinafter, some embodiments of the present invention will be described in detail through illustrative drawings. When adding reference numerals to components in each drawing, it should be noted that identical components are given the same reference numerals as much as possible even if they are shown in different drawings. Additionally, in describing the present invention, if it is determined that a detailed description of a related known configuration or function may obscure the gist of the present invention, the detailed description will be omitted.

Additionally, when describing the components of the present invention, terms such as first, second, A, B, (a), and (b) may be used.

These terms are only used to distinguish the component from other components, and the nature, or order of the component is not limited by the term. When a component is described as being "coupled," or "connected" to another component, that component may be directly connected or connected to that other component, but it will be understood that another component between each component may be "combined," or "connected".

FIG. 1 is a configuration diagram of a display device according to an embodiment.

Referring to FIG. 1, the display device 10 may include a panel 11, a source driver 12 (SDIC), a gate driver 13 (GDIC), and a timing controller 14.

A plurality of data lines (DL) and a plurality of gate lines (GL) may be disposed on the panel 11, and a plurality of pixels (P) may be disposed.

A plurality of pixels (P) may be arranged adjacent to each other in the horizontal (H) and vertical directions (V) of the panel 11 to form a square shape. The square shape is similar to a matrix shape, and a set of multiple pixels (P) arranged in the horizontal direction (H) or the horizontal line they represent may be defined as row or line, and a set of a plurality of pixels (P) arranged in the vertical direction (V) or the vertical line they represent may be defined as a column or channel.

The gate driver 13 may supply a scan signal of turn-on voltage or turn-off voltage to the gate line GL. When a scan signal with a turn-on voltage is supplied to the pixel (P), the pixel (P) is connected to the data line (DL), and when a scan signal with a turn-off voltage is supplied to the pixel (P), the pixel (P) connected to the data line (DL) is disconnected.

The source driver 12 supplies data voltage to the data line DL. The data voltage supplied to the data line (DL) is transmitted to the pixel (P) connected to the data line (DL) according to the scan signal.

The timing controller 14 may supply various control signals to each of the source driver 12 and the gate driver 13.

The timing controller 14 may output image data (RGB data) converted from externally input image data to the data format used by the source driver 12 to the source driver 12.

The timing controller 14 may generate a gate control signal (GCS) that starts scanning according to the timing implemented in each frame and transmit it to the gate driver 13.

The timing controller 14 may transmit a data control signal (DCS) that controls the source driver 12 to supply a data voltage to each pixel (P) according to each timing.

Figure 2:
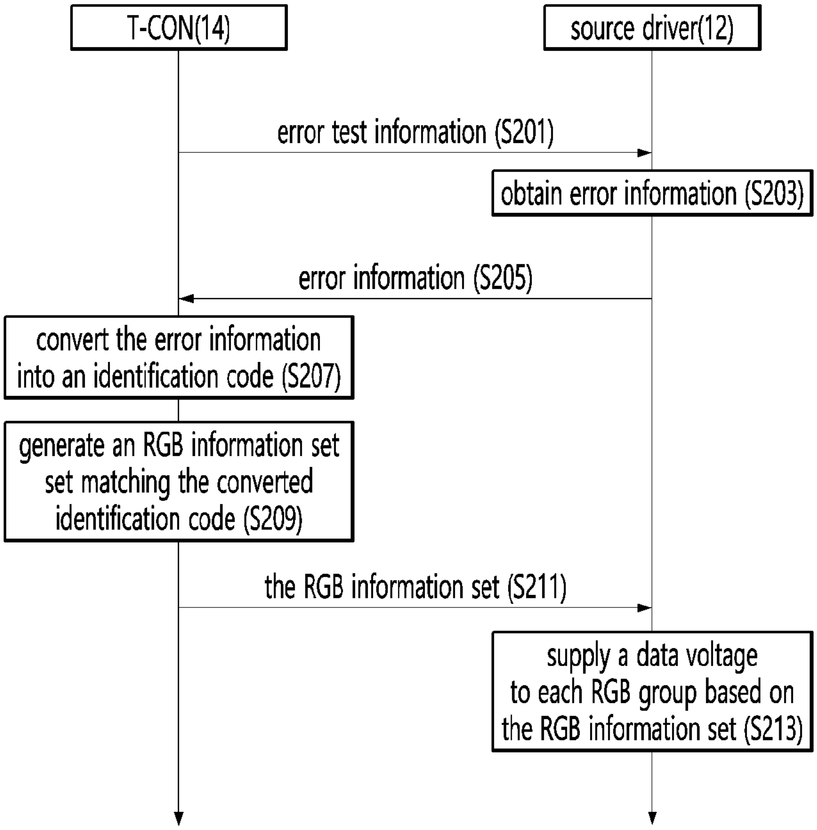
FIG. 2 is a flowchart illustrating a method of displaying status information of a display device according to an embodiment of the present invention.

FIG. 2 is a flowchart illustrating a method of displaying status information of a display device according to an embodiment of the present invention.

Referring to FIG. 2, the timing controller 14 of the display device 10 may transmit error test information to the source driver 12 (S201).

The error test information may include information for testing error in data transmitted from the timing controller 14 or an external device to the source driver 12.

In one embodiment, the error test information may include information for testing errors in image data that the timing controller 14 transmits to the source driver 12.

Error test information may include information for checking bit error in image data. As an example, the error test information may include a BER test pattern for testing the bit error rate (BER). The BER test pattern may be a pattern in which error is embedded in the bits that configure image data.

The source driver 12 may obtain error information based on the received error test information (S203).

In one embodiment, error information may include one or more of bit error rate (BER) or error type.

The source driver 12 may calculate the BER based on error test information. The source driver 12 may include an error detection circuit for detecting error included in error test information. The error detection circuit may detect error information through parity check or cyclic redundancy check (CRC).

The error detection circuit may include a BER detection circuit for detecting the BER.

In another embodiment, the source driver 12 may obtain error information indicating the type of error based on error test information.

The type of error may be one of a single bit error type, a multi-bit error type, a burst error type, and a random error type.

The single bit error type may be a type in which an error occurs in one bit during transmission of image data.

The multi-bit error type may be a type in which two or more bits are incorrect at the same time during transmission of image data.

The burst error type may be a type in which an error occurs in consecutive bits during transmission of image data.

The random error type may be a type in which a bit error occurs randomly during transmission of image data.

The error detection circuit of the source driver 12 may further include an error type detection circuit for detecting the type of error based on error test information.

The source driver 12 may transmit the acquired error information to the timing controller 14 (S205).

Error information may include one or more of BER or error type.

The timing controller 14 may convert the received error information into an identification code (S207).

In one embodiment, the identification code may be a code that may identify error information.

As an example, the identification code may be Morse code. Error information may be expressed as a number, numeric string, character, or string.

The identification code may include multiple Morse code sets. Each of the plurality of Morse code sets may include a plurality of Morse codes.

Figure 3:
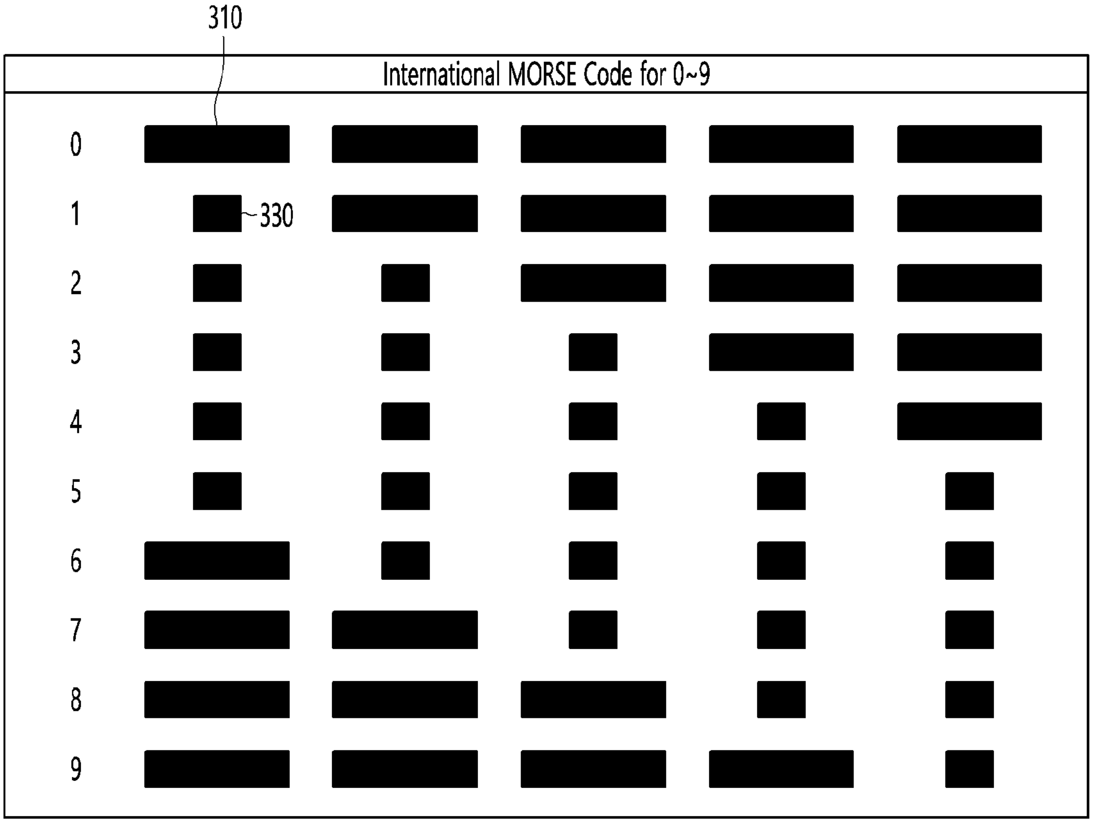
FIG. 3 is a diagram explaining a set of Morse code corresponding to numbers.

FIG. 3 is a diagram explaining a set of Morse codes corresponding to number.

Referring to FIG. 3, a plurality of Morse code sets corresponding to each number from 0 to 9 are shown.

Each Morse code set may include one or more of a first Morse code 310 or a second Morse code 330.

For example, the number 0 may be identified by five first Morse codes 310.

The number 1 may be identified by one second Morse code 330 and four first Morse codes 310 following it.

The number 2 may be identified by two second Morse codes 330 and three first Morse codes 310 following it.

The first Morse code 310 may be a code whose RGB value corresponds to a full white color (255, 255, 255) or a full black color (0, 0, 0).

The second Morse code 330 may be a code which a specific subpixel value among the R subpixel value, G subpixel value, and B subpixel value may correspond to 255, and the values of the remaining subpixels may correspond to 0. For example, the second Morse code 330 may be a code whose RGB value corresponds to full green color (0,255,0). However, this is only an example, and the second Morse code 330 may be a code whose RGB value corresponds to a full red color (255,0,0) or a full blue color (0,0,255).

Again, FIG. 2 will be described.

The timing controller 14 may generate an RGB information set matching the converted identification code (S209) and transmit the generated RGB information set to the source driver 12 (S211).

Timing controller 14 may generate a RGB information set that matches the Morse code corresponding to the error information.

The RGB information set may include a plurality of RGB information matching a Morse code set that each of the plurality of RGB groups constituting the panel 11 must represent.

RGB information may include RGB values provided to each of a plurality of RGB channels included in each RGB group.

The RGB information may include RGB values provided to each of a plurality of RGB pixels included in each of a plurality of RGB channels of the RGB group.

Timing controller 14 may transmit an RGB information set and a control signal to source driver 12 to supply data voltage based on the RGB information set.

The source driver 12 may supply a data voltage to each of the plurality of RGB groups included in the panel 11 based on the RGB information set (S213).

The source driver 12 may supply a data voltage corresponding to each RGB information included in the RGB information set to the corresponding RGB group.

The panel 11 may display an identification code based on the supplied data voltage.

Figure 4:
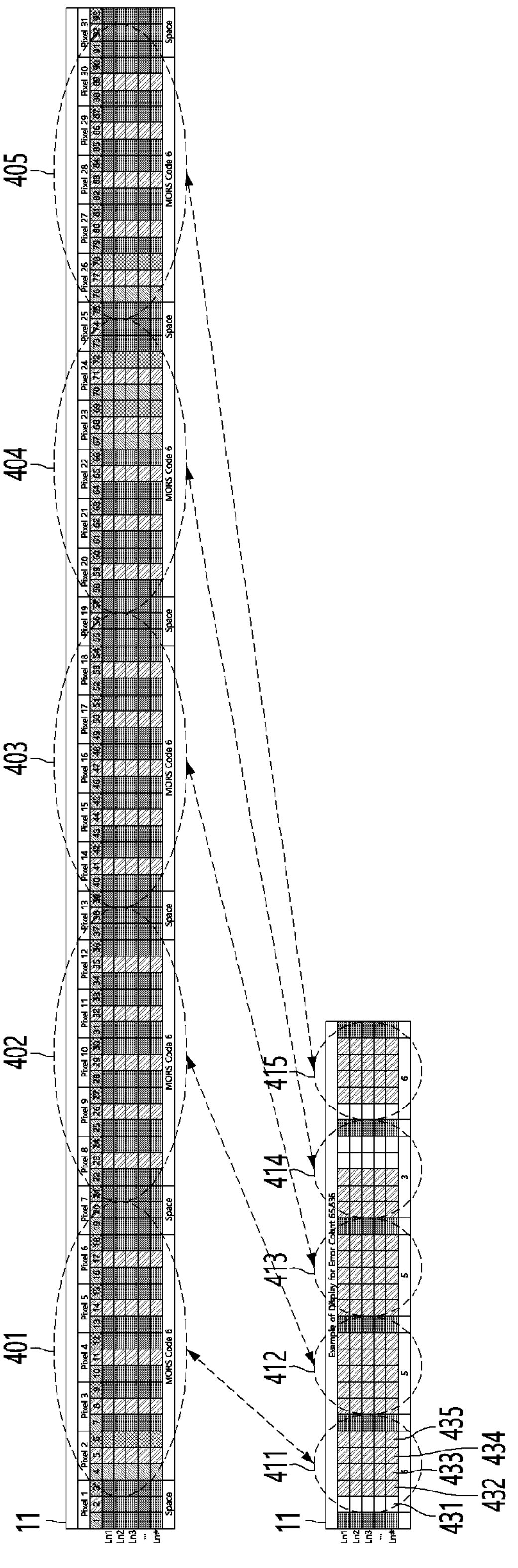
FIG. 4 is a diagram illustrating an example of displaying error information using Morse code according to an embodiment of the present invention.

FIG. 4 is a diagram illustrating an example of displaying error information using Morse code according to an embodiment of the present invention.

Referring to FIG. 4, panel 11 may include a plurality of RGB groups 401 to 405.

Each of the plurality of RGB groups 401 to 405 may include a plurality of RGB channels.

For example, the first RGB group 401 may include 2nd to 6th RGB channels (pixel 2 to pixel 6), and the second RGB group 402 may include 8th to 12th RGB channels (pixel 8 to pixel 12), the third RGB group 403 may include 14th to 18th RGB channels (pixel 14 to pixel 18), and the fourth RGB group 404 may include 20th to 24th RGB channels (pixel 20 to pixel 24), and the fifth RGB group 405 may include 26th to 30th RGB channels (pixel 26 to pixel 30).

Between RGB groups, there may be extra RGB channels (pixels 1, 7, 13, 19, 25, and 31) to distinguish Morse code.

For example, an extra seventh RGB channel (pixel 7) may be disposed between the first RGB group 401 and the second RGB group 402. One or more extra RGB channels may be provided between dots, lines, or numbers.

Each RGB channel may include a plurality of RGB pixels in the form of a column. The plurality of RGB pixels included in each RGB channel may be arranged in a column form.

Each of the plurality of RGB pixels may include an R subpixel, a G subpixel, and a B subpixel.

A dot in Morse code may be expressed using only one type of pixel included in the RGB channel, and a line in Morse code may be expressed using all three types of pixels included in the RGB channel.

Additionally, each RGB group of the panel 11 may express more lines by using white color on a black color background or black color on a white color background.

Other types of pixels that are not used for Morse code dots may also be used as borders between numbers.

In FIG. 4, it is assumed that the error information is a number string called 65536. In this case, the first RGB group 401 may represent a Morse code set corresponding to "6", the second RGB group 402 may represent a Morse code set corresponding to "5", and the third RGB group 403 may represent a Morse code set corresponding to "5", the fourth RGB group 404 may represent a Morse code set corresponding to "3", and the fifth RGB group 405 may represent a Morse code set corresponding to "6".

The Morse code set shown at number "6" shown in FIG. 3 may be composed of a first Morse code 310 and four consecutive second Morse codes 330 following the first Morse code 310.

To express the first Morse code 310, the timing controller 14 may obtain the RGB value of the plurality of RGB pixels included in the second RGB channel (pixel 2) as a value (255, 255, 255) corresponding to full white color.

To express four consecutive second Morse codes 330, the timing controller 14 may obtain the RGB value of the plurality of RGB pixels included in each of the third to sixth RGB channels (pixel 3 to pixel 6) as the value (0, 255, 0) corresponding to the full green color.

In this way, the timing controller 14 may obtain RGB values for a plurality of RGB channels included in each RGB group for the remaining number string "5536".

The timing controller 14 may generate RGB values for a plurality of RGB channels included in each RGB group as RGB information.

The timing controller 14 may generate first RGB information such that the first RGB group 401 represents a Morse code set corresponding to "6."

The timing controller 14 may generate second RGB information such that the second RGB group 402 represents the Morse code set corresponding to "5".

The timing controller 14 may generate third RGB information so that the third RGB group 403 represents a Morse code set corresponding to "5".

The timing controller 14 may generate fourth RGB information such that the fourth RGB group 404 represents a Morse code set corresponding to "3."

The timing controller 14 may generate fifth RGB information so that the fifth RGB group 405 represents a Morse code set corresponding to "6."

The timing controller 14 may transmit an RGB information set including first to fifth RGB information to the source driver 12.

The source driver 12 may supply a data voltage to each RGB group based on the RGB information set.

The source driver 12 may supply a first data voltage corresponding to the first RGB information to the first RGB group 401.

The source driver 12 may supply a second data voltage corresponding to the second RGB information to the second RGB group 402.

The source driver 12 may supply a third data voltage corresponding to the third RGB information to the third RGB group 403.

The source driver 12 may supply a fourth data voltage corresponding to the fourth RGB information to the fourth RGB group 404.

The source driver 12 may supply a fifth data voltage corresponding to the fifth RGB information to the fifth RGB group 405.

The first RGB group 401 constituting the panel 11 may display a first Morse code set 411 corresponding to the number "6" according to the first data voltage. The first Morse code set 411 may represent Morse codes corresponding to the number "6" shown in FIG. 3. The first Morse code set 411 may include full white color of column format 431 corresponding to the first Morse code 310 and full green columns 432 to 435 corresponding to the second Morse code 330.

The second RGB group 402 constituting the panel 11 may display a second Morse code set 412 corresponding to the number "5" according to the second data voltage. The second Morse code set 412 may include full green columns corresponding to the second Morse code 330.

The third RGB group 403 constituting the panel 11 may display a third Morse code set 413 corresponding to the number "5" according to the third data voltage. The third Morse code set 413 is the same as the second Morse code set 412.

The fourth RGB group 404 constituting the panel 11 may display a fourth Morse code set 414 corresponding to the number "3" according to the fourth data voltage. The fourth Morse code set 414 may include three rows of full green columns and two rows of full white columns.

The fifth RGB group 405 constituting the panel 11 may display a fifth Morse code set 415 corresponding to the number "6" according to the fifth data voltage. The fifth Morse code set 415 is the same as the first Morse code set 411.

Since the panel 11 is not interlocked with the gate driver 13 during shipping inspection, the panel 11 may display a set of Morse code on a line (column) basis.

In this way, according to an embodiment of the present invention, the internal state and error state of the source driver 12 are may be accurately and simply identified as a specific test result for the source driver 12 is displayed on the panel 11 using Morse code.

In addition, according to an embodiment of the present invention, information about error may be provided without the need for a separate read-back protocol to be implemented in the shipping inspection device that inspects the display device 10, thereby reducing costs.

Additionally, according to an embodiment of the present invention, error information may be identified by probing only some RGB groups of the panel 11, so error test result may be easily performed.

Figure 5:
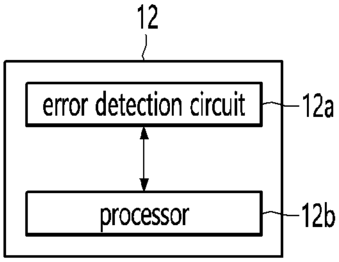
FIG. 5 is a block diagram explaining the configuration of a source driver according to an embodiment of the present disclosure.

FIG. 5 is a block diagram explaining the configuration of a source driver according to an embodiment of the present disclosure.

Referring to FIG. 5, the source driver 12 may include an error detection circuit **12*a* and a processor 12*b***.

The error detection circuit **12*a* may detect an error based on error test information received from the timing controller 14** or an external device.

Error detection circuit **12*a*** may detect one or more of BER or error type based on error test information.

The error detection circuit **12*a*** may detect error through parity check or cyclic redundancy check (CRC).

The processor **12*b* may control the overall operation of the source driver 12**.

The processor **12*b*** may convert the obtained error information into an identification code.

Processor **12*b*** may generate a set of RGB information matching the converted identification code.

The processor **12*b* of the source driver 12** may supply a data voltage to each RGB group based on RGB information.

Figure 6:
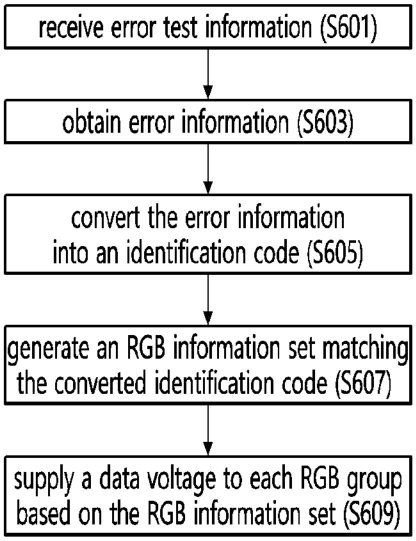
FIG. 6 is a flowchart illustrating a method of operating a source driver according to an embodiment of the present disclosure.

FIG. 6 is a flowchart illustrating a method of operating a source driver according to an embodiment of the present disclosure.

FIG. 6 is a diagram illustrating an embodiment in which the source driver 12 performs some functions of the timing controller 14 described in the embodiment of FIG. 2.

In FIG. 6, parts overlapping with those explained in FIG. 2 are borrowed from the embodiment of FIG. 2.

Referring to FIG. 6, the error detection circuit **12*a* of the source driver 12 may receive error test information (S601**).

The error test information may include information for testing error in data transmitted from the timing controller 14 to the source driver 12.

In one embodiment, the error test information may include information for testing errors in image data that the timing controller 14 transmits to the source driver 12.

Error test information may include information for checking bit error in image data. As an example, the error test information may include a BER test pattern for testing the bit error rate (BER). The BER test pattern may be a pattern in which error is embedded in the bits that make up image data.

The error detection circuit **12*a* of the source driver 12 may obtain error information based on the received error test information (S603**).

The error detection circuit **12*a* may calculate the BER based on the error test information. The error detection circuit 12*a*** may include an error detection circuit for detecting an error included in error test information. As an example, the error detection circuit may include a BER detection circuit to detect BER.

In another embodiment, the error detection circuit **12*a*** may obtain error information indicating the type of error based on error test information.

The type of error may be one of a single bit error type, a multi-bit error type, a burst error type, and a random error type.

The processor **12*b* of the source driver 12 may convert the obtained error information into an identification code (S605**).

In one embodiment, the identification code may be a code that may identify error information.

As an example, the identification code may be Morse code. Error information may be expressed as numbers, letters, or strings.

Error information may be expressed through a combination of Morse codes. If the error information is numeric, multiple Morse code sets of FIG. 3 corresponding to 0 to 9 may be used to identify the error information.

The processor **12*b* of the source driver 12 may generate an RGB information set matching the converted identification code (S607**).

The RGB information set may include a plurality of RGB information matching a Morse code set that each of the plurality of RGB groups constituting the panel 11 must represent.

The RGB information may include RGB values provided to each of a plurality of RGB pixels included in each of a plurality of RGB channels of the RGB group.

The processor **12*b* of the source driver 12 may supply a data voltage to each RGB group based on RGB information (S609**).

The processor 12b of the source driver 12 may supply a data voltage corresponding to each RGB information included in the RGB information set to the corresponding RGB group.

An example of displaying error information using Morse code adopts the embodiment of FIG. 4.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage device.

The display device described above is not limited to the configuration and method of the above-described embodiments, and the embodiments may be configured by selectively combining all or part of each embodiment so that various modifications may be made.

What is claimed is:

1. A display device, comprising:
a panel configured to include a plurality of RGB groups, each of the plurality of RGB groups includes a plurality of RGB channels and each of the plurality of RGB channels includes a plurality of RGB pixels; and
a source driver configured to:
obtain error information based on error test information for testing an error of data transmitted from a timing controller,
convert the error information into an identification code,
generate an RGB information set matching the identification code, and
supply a data voltage to the each of the plurality of RGB groups constituting the panel based on the generated RGB information set, wherein the panel is configured to display the identification code based on the data voltage.

2. The display device of claim 1, wherein the identification code includes a plurality of Morse code sets, each of the plurality of Morse code sets includes a plurality of Morse codes, and
wherein extra RGB channels are disposed between the plurality of RGB groups to distinguish the plurality of Morse code sets.

3. The display device of claim 2, wherein the each of the plurality of Morse code sets includes at least one of a first Morse code or a second Morse code.

4. The display device of claim 3, wherein the first Morse code is a code that an RGB value corresponds to full white color or full black color, and
wherein the second Morse code is a code that only a value of a specific subpixel among a R subpixel value, a G subpixel value, and a B subpixel value is 255, and values of remaining subpixels are 0.

5. The display device of claim 1, wherein the RGB information set includes a plurality of RGB information matching a Morse code that each of the plurality of RGB groups represents, and
each of the plurality of RGB information includes RGB values provided to the each of the plurality of RGB pixels included in the each of the plurality of RGB channels of the each of the plurality of RGB groups.

6. The display device of claim 1, wherein the error information is a Bit Error Rate or an error type.

7. The display device of claim 6, wherein the error information is expressed as either a number, a string of numbers, a letter, or a string.

8. The display device of claim 1, wherein the source driver further comprises an error detection circuit configured to detect the error information from the error test information.

9. The display device of claim 8, wherein the error detection circuit is configured to detect the error information through a parity check or a cyclic redundancy check (CRC).

10. The display device of claim 1, wherein the plurality of RGB channels included in the each of the plurality of RGB groups is arranged in column form.

11. A method for displaying the status of a display device including a panel including a plurality of RGB groups, and a source driver, the method comprising:
obtaining, by the source driver, error information based on error test information for testing an error of data transmitted from a timing controller;
converting, by the source driver, the obtained error information into an identification code;
generating, by the source driver, an RGB information set matching the identification code;
supplying, by the source driver, a data voltage to each of the plurality of RGB groups constituting the panel based on the generated RGB information set; and
displaying, by the panel, the identification code based on the data voltage.

12. The method of claim 11, wherein the identification code includes a plurality of Morse code sets, each of the plurality of Morse code sets includes a plurality of Morse codes, and
wherein extra RGB channels are disposed between the plurality of RGB groups to distinguish the plurality of Morse code sets.

13. The method of claim 12, wherein the each of the plurality of Morse code sets includes at least one of a first Morse code or a second Morse code.

14. The method of claim 13, wherein the first Morse code is a code that an RGB value corresponds to full white color or full black color, and
wherein the second Morse code is a code that only a value of a specific subpixel among an R subpixel value, a G subpixel value, and a B subpixel value is 255, and values of remaining subpixels are 0.

15. The method of claim 11, wherein the RGB information set includes a plurality of RGB information matching a Morse code that each of the plurality of RGB groups represents, and
each of the plurality of RGB information includes RGB values provided to each of a plurality of RGB pixels included in each of a plurality of RGB channels of each of the plurality of RGB groups.

16. The method of claim 11, wherein the error information is a Bit Error Rate or an error type.

17. The method of claim 16, wherein the error information is expressed as either a number, a string of numbers, a letter, or a string.

18. The method of claim 11, wherein the source driver comprises an error detection circuit, and the method further comprises detecting, by the error detection circuit, the error information from the error test information.

19. The method of claim 11, wherein the step of obtaining the error information includes
detecting the error information through a parity check or a cyclic redundancy check (CRC).

20. The method of claim 15, wherein the plurality of RGB channels included in the each of the plurality of RGB groups is arranged in column form.

* * * * *